(12) United States Patent
Muzilla et al.

(10) Patent No.: US 6,500,125 B1
(45) Date of Patent: Dec. 31, 2002

(54) ULTRASOUND B/COLOR PRIORITY THRESHOLD CALCULATION

(75) Inventors: David J. Muzilla, Mukwonago; Gary E. MacLeod, Menomonee Falls, both of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/538,187

(22) Filed: Mar. 30, 2000

(51) Int. Cl.[7] .................................................. A61B 8/00
(52) U.S. Cl. ...................................... 600/454; 600/455
(58) Field of Search ........................... 600/455, 454, 600/443, 447, 456, 457, 453, 441, 442; 128/916

(56) References Cited

U.S. PATENT DOCUMENTS

| | | |
|---|---|---|
| 6,017,309 A | 1/2000 | Washburn et al. |
| 6,030,344 A | 2/2000 | Guracar et al. |
| 6,110,119 A * | 8/2000 | Hall ........................... 600/455 |
| 6,162,176 A * | 12/2000 | Washburn et al. .......... 600/454 |

FOREIGN PATENT DOCUMENTS

| | | |
|---|---|---|
| EP | 0 830 842 A1 | 3/1998 |
| EP | 0 952 458 A2 | 10/1999 |
| WO | WO 00/41003 | 7/2000 |

\* cited by examiner

*Primary Examiner*—Marvin M. Lateef
*Assistant Examiner*—Mavlin Patel
(74) *Attorney, Agent, or Firm*—McAndrews, Held & Malloy, Ltd.; Peter J. Vogel; Michael A. Dellapenna

(57) ABSTRACT

An ultrasound color flow imaging system is programmed to optimize display images on a display monitor (18) by automatically adjusting a threshold. B-mode data corresponding to valid color data is subjected to statistical analysis including mean and standard deviation (S3). The threshold is computed according to mean plus k (standard deviation), where k preferably is based on a linear regression equation.

16 Claims, 5 Drawing Sheets

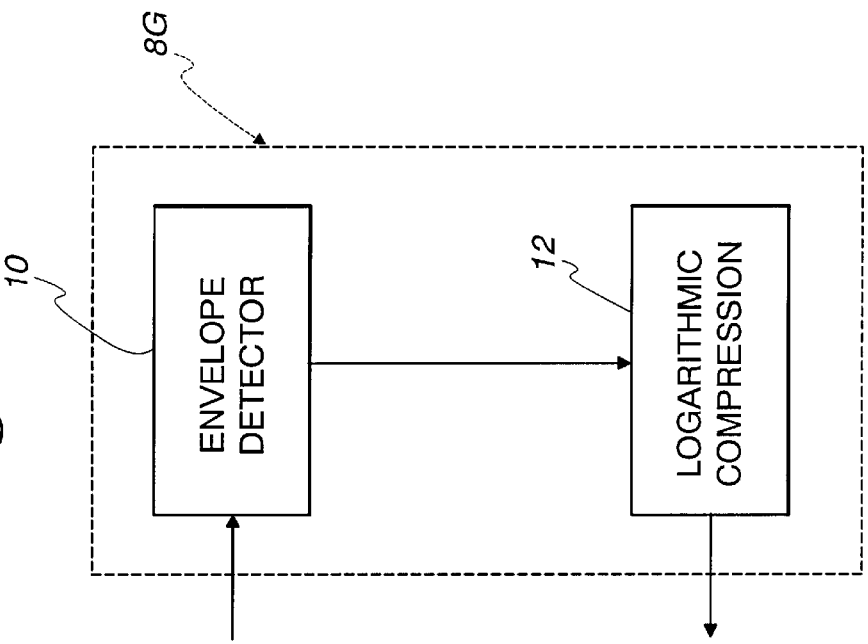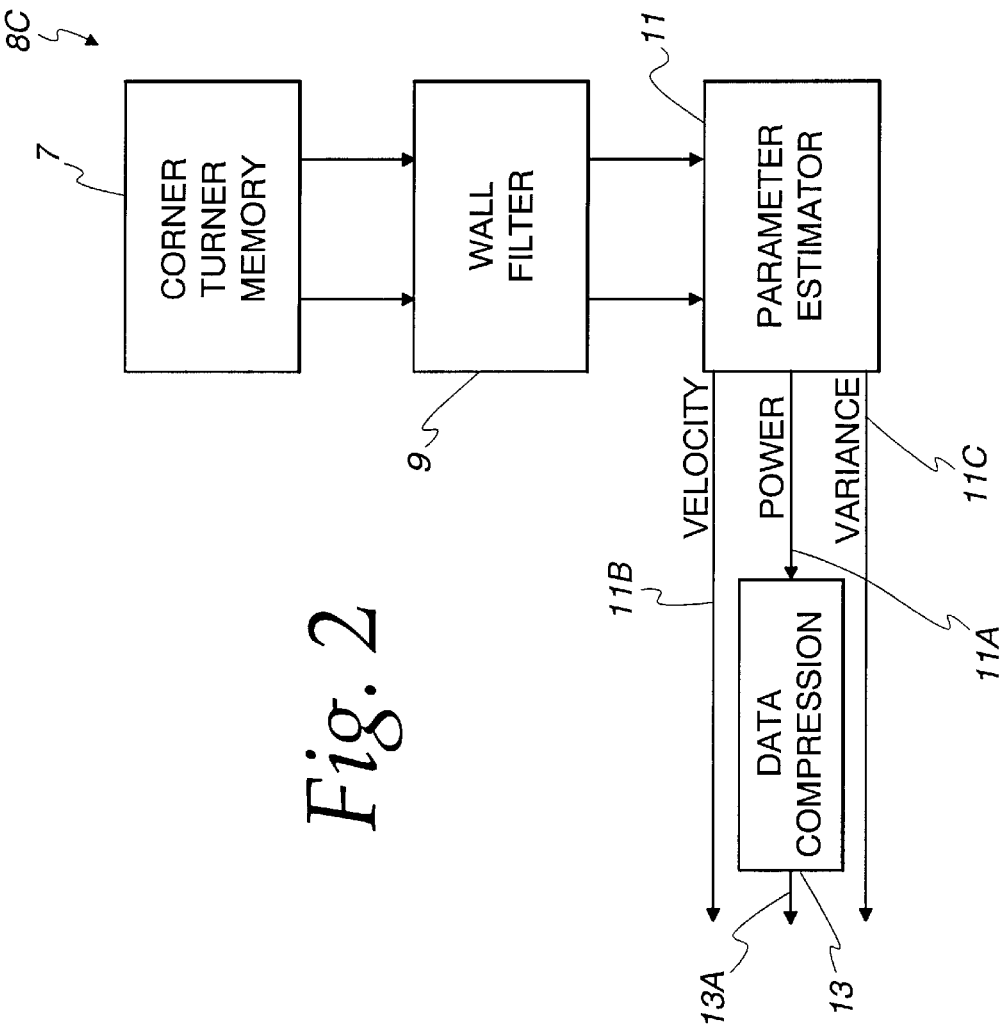

ULTRASOUND B/COLOR PRIORITY THRESHOLD CALCULATION

BACKGROUND OF THE INVENTION

This invention generally relates to ultrasound color flow Doppler imaging of fluid flow fields. In particular, the invention relates to a method and an apparatus for improving the display of such imaging by calculating, a threshold.

Ultrasonic scanners for detecting blood flow based on the Doppler effect are well known. Such systems operate by actuating an ultrasonic transducer array to transmit ultrasonic waves into the object and receiving ultrasonic echoes backscattered from the object. In the measurement of blood flow characteristics, returning ultrasonic waves are compared to a frequency reference to determine the frequency shift imparted to the returning waves by flowing scatterers such as blood cells. This frequency, i.e., phase shift, translates into the velocity of the blood flow. The blood velocity is calculated by measuring the phase shift from firing to firing at a specific range gate.

The change or shift in backscattered frequency increases when blood flows toward the transducer and decreases when blood flows away from the transducer. Color flow images are produced by superimposing a color image of the velocity of moving material, such as blood, over a black and white anatomical B-mode image. Typically, color flow mode displays hundreds of adjacent sample volumes simultaneously, all laid over a B-mode image and color-coded to represent each sample volume's velocity.

Typically, color flow processors estimate blood flow velocity, blood flow power Doppler imaging (PDI) and blood flow variance. Typically, color flow data is used to modify the color of a region of interest on a display screen. The user selects the type of data used for the display. The modes typically available are power only, velocity only or velocity and variance combined.

When operating in the color velocity or power Doppler imaging (PDI) modes on an ultrasound scanner, sometimes the color spills out of the vessel and writes on the vessel walls or surrounding plaque and tissue. This is an artifact caused by the fact that the color firings and the b-mode firings are independent of each other and that the resultant color flow image must be overlayed into the b-mode image. Differences in spatial and temporal resolution and registration between color and b-mode contribute to this articraft. The effectiveness of color flow wall filtering and power thresholding can also contribute to this artifact. The current LOGIQ 700 product manufactured by General Electric has a B/Color priority threshold which helps to minimize this artifact. For a given display pixel location, when the b-mode gray scale level is above this B/Color priority threshold, the b-mode or gray scale pixel will be written to that pixel location on the display. Otherwise color will be written if there is a valid color value associated with that pixel. Plaque, tissue, and vessel walls typically have a higher gray scale level than those regions containing real flow. The B/Color priority threshold, therefore, helps to eliminate color bleeding onto these higher gray scale regions. The problem is that B/Color priority threshold is typically preset to some level which may or may not be adequate for any particular patient anatomy or user settings such as gain and dynamic range. Even if this threshold can be manually adjusted by the user, the typical user is not likely to be willing to search for the best threshold, and the resolution of the threshold selections may not be adequate to start with.

Accordingly, there is a need for a color flow ultrasound scanner which can automatically adjust the B/color priority threshold according to the actual B-mode data.

In the color flow power or color flow velocity modes of operation, known ultrasound scanners provide user selectable color maps that are applied to the color mode data. In the power mode, the possible data values are 7-bits (0–127). In the velocity mode, the data values are signed 7-bits (−128 to +127). In a known system, any given map is fixed with the colors in the map being applied across the range of data values for power or velocity modes. There are also fixed map thresholds which are set such that color data will be displayed if it is above this threshold and will not be displayed if it is below this threshold. Such thresholding typically is used to minimize unwanted noise and artifacts. The fixed map threshold may be too high for some scanning situations, causing low flow to be thresholded out even if no artifacts are present. As a result, there is a need for a color flow system in which the map and map threshold can be adjusted automatically.

BRIEF SUMMARY OF THE INVENTION

The preferred embodiment is useful in an ultrasound imaging system generating color flow signals and b-mode signals in response to ultrasound signals backscattered from a subject under study. In such an environment, improved image display can be achieved in response to the color flow signals and b-mode signals by receiving and altering a conventional threshold signal. Color flow data is stored in response to the color flow signals and corresponding b-mode data is stored in response to the b-mode signals, preferably in a memory. An identification of valid color flow data is obtained and an analysis of b-mode data corresponding to the valid color flow data is conducted, preferably by a logic unit. The value of the threshold signal is altered in response to the analysis. A color flow image is displayed in response to the altered threshold signal, preferably on an ultrasound display.

By using the foregoing techniques, a color flow display can be superimposed on a b-mode display while minimizing color bleeding artifacts.

BRIEF DESCRIPTION OF THE DRAWINGS

FIG. 2 is a schematic block diagram showing the mid processor color flow apparatus illustrated in FIG. 1.

FIG. 3 is a schematic block diagram showing the mid processor B-mode apparatus illustrated in FIG. 1.

DETAILED DESCRIPTION OF THE INVENTION

Figure 1:
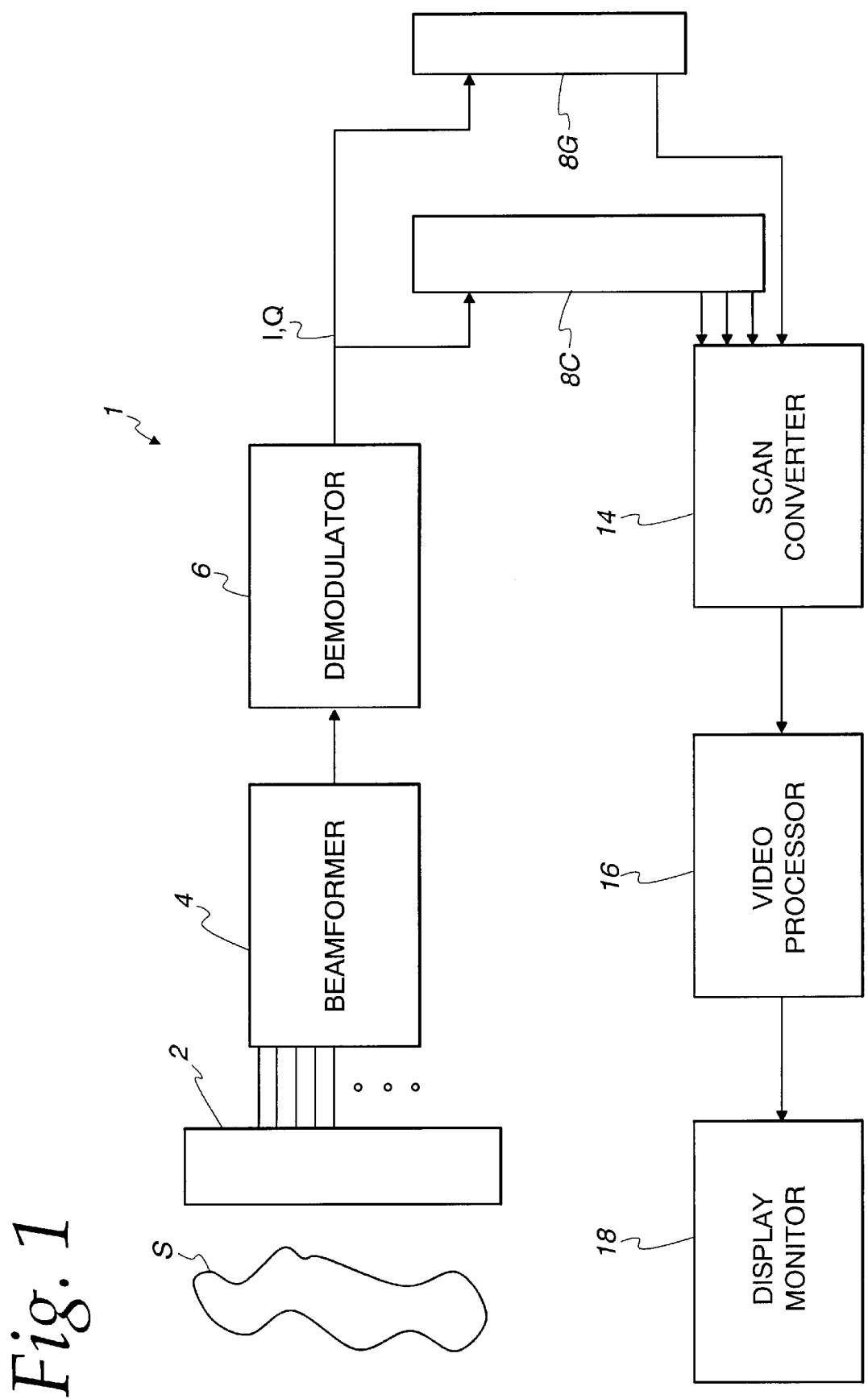
FIG. 1 is a schematic block diagram showing the signal processing chain for a conventional color flow and B-mode ultrasound imaging system.

Referring to FIG. 1, the basic signal processing chain for a color flow and gray scale imaging system 1 comprises an ultrasound transducer array 2, which is activated to transmit pulse sequences comprising tone bursts of length P which are fired repeatedly at a pulse repetition frequency (PRF) which typically is in the kilohertz range. The pulse sequences, including burst lengths P, are different for the color flow and B-mode processing. For color flow imaging, P may be 4 to 8 cycles, and the tone bursts are focused at the same transmit focal position with the same transmit characteristics.

A series of color flow transmit firings focused at the same transmit focal position are referred to as a "packet". Each transmit beam propagates through the subject S being scanned and is reflected by ultrasound scatterers in the subject S.

The return RF signals are detected by the transducer elements and received by the respective receive channels in the beamformer 4. The beamformer sums the delayed channel data and outputs in a beam summed signal which is demodulated into in-phase and quadrature (I/Q) signal components by a demodulator 6. The B-mode I, Q outputs from demodulator 6 are transmitted to a mid processor 8G for gray scale B-mode processing, and the color flow I, Q outputs from demodulator 6 are transmitted to a mid-processor 8C for color processing.

FIG. 2 illustrates mid-processor 8C. The I/Q signal components from demodulator 6 are stored in a corner turner memory 7, whose purpose is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are passed through a wall filter 9 which rejects any clutter corresponding to stationary or very slow-moving tissue. The filtered outputs are then fed into a parameter estimator 11, which converts the range cell information into the intermediate autocorrelation parameters N, D and R(O). N and D are the numerator and denominator for the autocorrelation equation, as shown below:

$$N = \sum_{i=1}^{M-1} (I_i Q_{i+1} - I_{i+1} Q_i) \quad (2)$$

$$D = \sum_{i=1}^{M-1} (I_i I_{i+1} + Q_i Q_{i+1}) \quad (3)$$

where $I_i$ and $Q_i$ are the demodulated, basebanded input data for firing i, and M is the number of firings in the packet. R(O) is approximated as a finite sum over the number of firings in a packet, as follows:

$$R(O) = \sum_{i=1}^{M-1} \frac{(I_i^2 + Q_i^2 + I_{i+1}^2 + Q_{i+1}^2)}{2} \quad (4)$$

A processor converts N and D into a magnitude and phase for each range cell. The equations used are as follows:

$$|R(T)| = \sqrt{N^2 + D^2} \quad (5)$$

$$\phi(R(T)) = \tan^{-1}\left[\frac{N}{D}\right] \quad (6)$$

The parameter estimator processes the magnitude and phase values into signals having values representing estimates of power, velocity and turbulence or variance which are transmitted on conductors 11A, and 11B and 11C, respectively. The phase is used to calculate the mean Doppler frequency, which is proportional to the velocity as shown below; R(O) and |R(T)| (magnitude) are used to estimate the turbulence.

The mean Doppler frequency in hertz is obtained from the phase of N and D and the pulse repetition from T:

$$\bar{f} = \frac{1}{2\pi T} \tan^{-1}\left[\frac{N}{D}\right] = \frac{1}{2\pi T}(\phi(R(T))) \quad (7)$$

The mean velocity is calculated using the Doppler shift equation below. Since θ, the angle between the flow direction and the sampling direction, is not known, cos θ is assumed to be 1.0.

$$\bar{v} = \frac{\bar{f}}{f_o} \frac{c}{2\cos\theta} \quad (8)$$

Preferably, the parameter estimator does not calculate the mean Doppler frequency as an intermediate output, but calculates $\bar{v}$ directly from the phase output of the processor using a look-up table.

The turbulence may be calculated in the time domain as a second-order series expansion of the variance of the mean Doppler frequency. The time domain expression for turbulence involves calculating the zero-lag and one-lag autocorrelation functions, R(O) and R(T) respectively. The exact autocorrelation functions are approximated by finite sums over the known data in the number of firings in a packet:

$$\sigma^2 = \frac{2}{(2\pi T)^2}\left[1 - \frac{|R(T)|}{R(O)}\right] \quad (9)$$

The mean value signal θ (R(T)) is an estimate of the mean Doppler frequency shift of the flowing reflectors, which in turn is proportional to the mean blood flow velocity. The variance signal $\sigma^2$ indicates the frequency spread of the flow signal component of the baseband echo signal. This value is indicative of flow turbulence, since laminar flow has a very narrow range of velocities, while turbulent flow is a mixture of many velocities. To indicate the strength of the signal from the flowing reflectors, the signal R(O) indicates the amount of the returned power in the Doppler-shifted flow signal.

The signal power on conductor 11A is passed through a data compression module 13 which compresses the data according to families of data compression curves. A different family of curves can be provided for different scanning applications. For example, one family of curves is provided for renal scanning, while another family of curves is provided for carotid artery scanning. Typically, there are about three curves per family. The dynamic range of the signals is changed according to the curve used for the data compression. The curves in each family are arranged in order of increasing dynamic range. Controller 26 sets the default curve when a user selects the scan application. The dynamic range controls the range of intensities or lumens created on display 18.

Referring to FIG. 3, gray scale B-mode mid-processor 8G includes an envelope detector 10 for forming the envelope of the beamsummed receive signal by computing the quantity $(I^2+Q^2)^{1/2}$. The envelope of the signal undergoes some additional B-mode processing, such as logarithmic compression (block 12 in FIG. 3), to form display data which is output to the scan converter 14 (FIG. 1).

Referring again to FIG. 1, the color flow estimates and gray scale display data are sent to the scan converter 14, which converts the data into X-Y format for video display. The scan-converted frames are passed to a video processor 16, which basically maps the video data to a display color map and gray scale image frames for video display. The image frames are then sent to the video monitor 18 for display. Typically, for color images, either velocity or power are displayed alone or velocity is displayed in conjunction with either power or turbulence. System control is centered in a host computer (not shown), which accepts operator inputs through an operator interface (e.g., a keyboard) and in turn controls the various subsystems.

In general, for B-mode gray scale images, the display data is converted by the scan converter 14 into X-Y format for video display. The scan-converted frames are passed to the video processor 16, which maps the video data to a gray scale or mapping for video display. The gray scale image frames are then sent to the video monitor 18 for display.

The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

Figure 4:
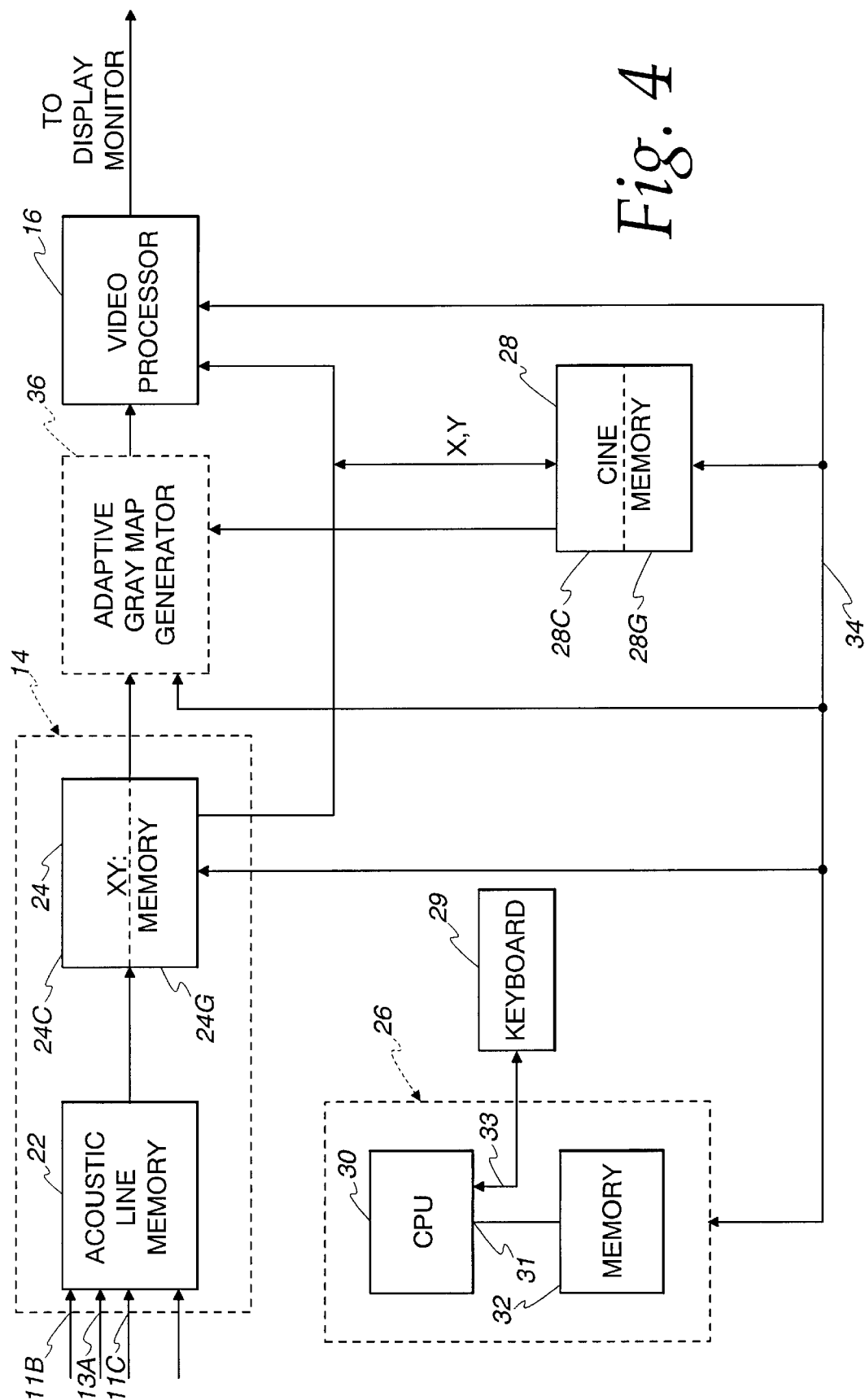
FIG. 4 is a schematic block diagram showing additional details of portions of the system illustrated in FIG. 1.

Referring to FIG. 4, system control is centered in a master controller or host computer 26, which accepts operator inputs through an operator interface (not shown) and in turn controls the various subsystems. The master controller 26 also generates the system timing and control signals. The master controller 26 comprises a logic unit which takes the form of a central processing unit (CPU) 30 and a random access memory 32. CPU 30 may comprise any logic unit suitable for arithmetic and logic operations, such as a digital signal processor, or application specific integrated circuit. A keyboard 29 is used to enter data into CPU 30. The CPU 30 has read only memory incorporated therein for storing routines used in constricting gray and color maps based on acquired raw data.

The scan converter 14 comprises an acoustic line memory 22 and an X-Y memory 24. The B-mode and color mode intensity data stored in polar coordinate (R-θ) sector format in acoustic line memory 22 is transformed to appropriately scaled Cartesian coordinate pixel display data, which is stored in X-Y memory 24. The color data is stored in memory locations 24C, and the gray scale data is stored in memory locations 24G. The scan-converted frames are passed to video processor 16, which maps the data to a gray map for video display. The gray scale image frames are then sent to the video monitor for display.

Successive frames of acoustic sample data are stored in cine memory 28 on a first-in, first-out basis. Color frames are stored in memory locations 28C, and gray scale frames are stored in memory locations 28G. In the color region of interest, for every word of color data corresponding to a display pixel, there is a corresponding word of B-mode gray scale data corresponding to that pixel. The cine memory is like a circular image buffer that runs in the background, continually capturing acoustic sample data that is displayed in real time to the user. When the user freezes the system, the user has the capability to view acoustic sample data previously captured in cine memory.

The CPU 30 controls the XY memory 24 and the cine memory 28 via the system control bus 34. In particular, the CPU 30 controls the flow of raw data from the XY memory 24 to the video processor 16 and to the cine memory 28 and from the cine memory to the video processor 16 and to the CPU 30 itself. The CPU also loads the gray maps and color maps into the video processor.

Image frames are collected in cine memory 28 on a continuous basis. The cine memory 28 provides resident digital image storage for single image review and multiple image loop review and various control functions. The region of interest displayed during single-image cine replay is that used during the image's acquisition. The cine memory also acts as a buffer for transfer of images to digital archival devices (not shown) via the master controller 26.

Figure 5:
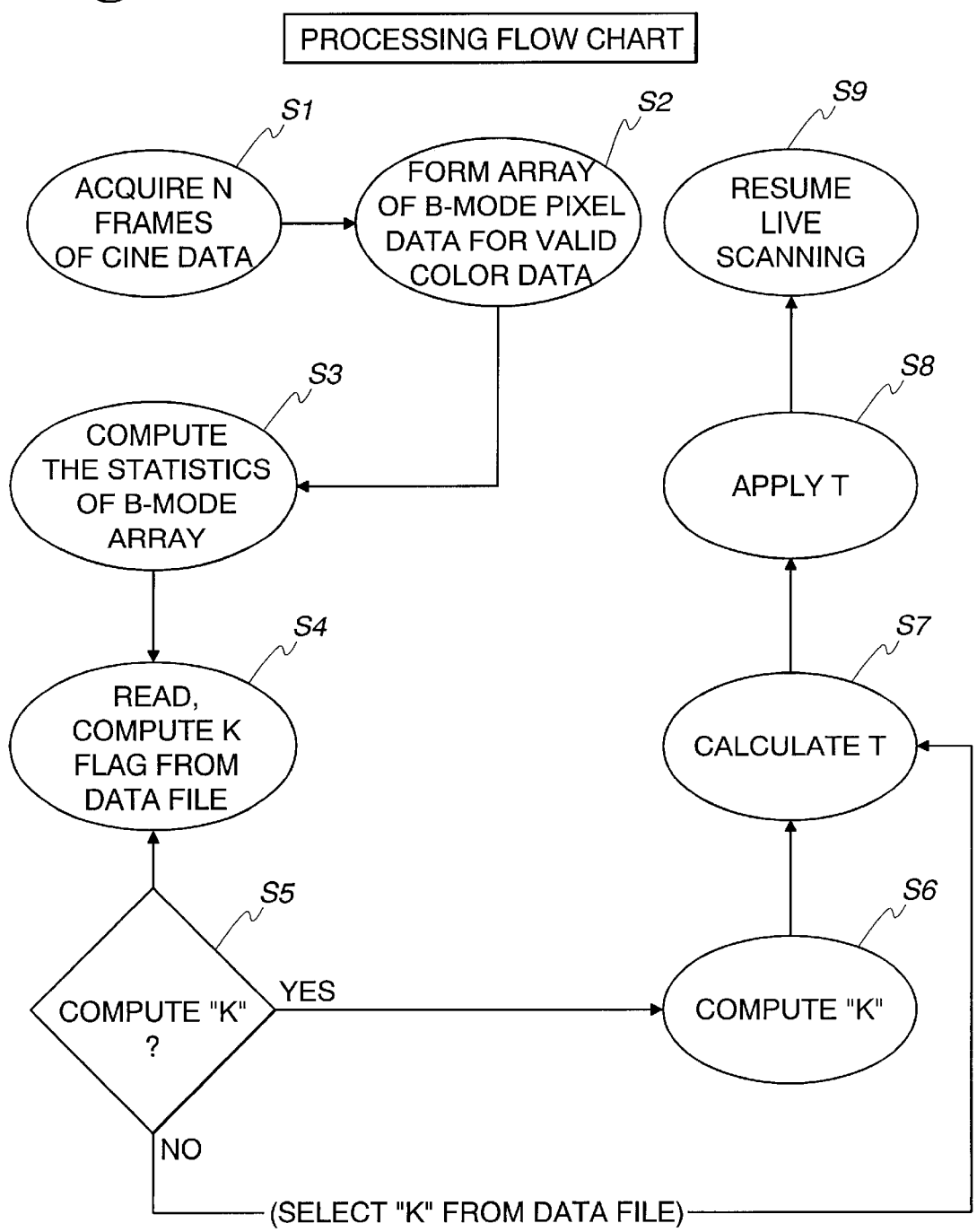
FIG. 5 is a flow charting illustrating a preferred operating mode for analyzing the data stored in the cine memory shown in FIG. 4.

CPU 30 causes memory 32 to capture N frames of color flow and associated b-mode data from cine memory 28 over at least one cardiac cycle and then processes this data statistically to determine to what level the B/Color priority threshold should be set. This action can be initiated manually in some form by the user via keyboard 29 or can be initiated periodically in an automatic manner by the system. The B/Color priority threshold can be input to terminal 33 from keyboard 29, or can be input to terminal 31 from memory 32. FIG. 5 is a flow chart of the processing algorithm.

Figure 6:
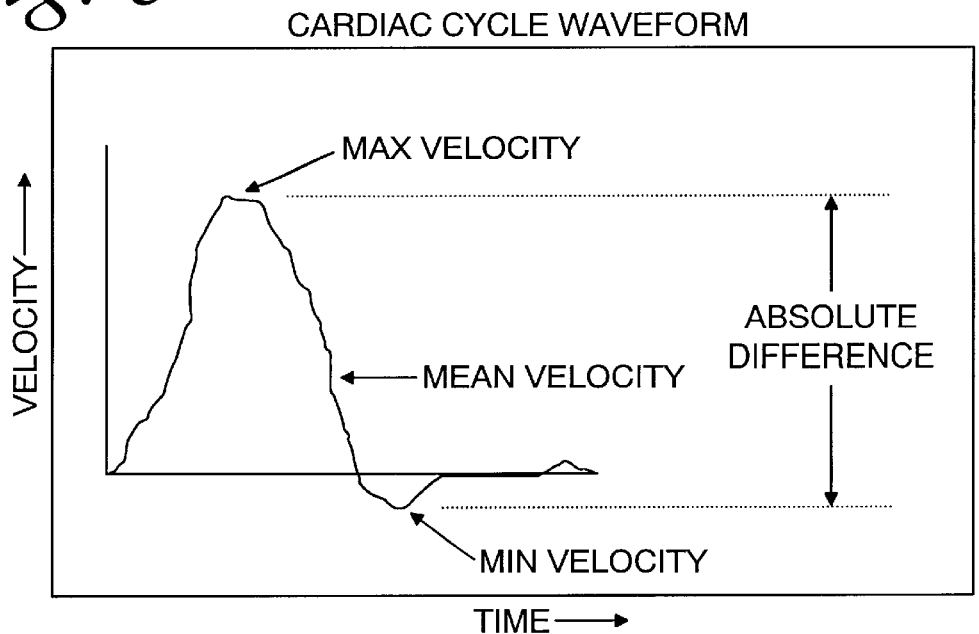
FIG. 6 is a graph showing a cardiac cycle over which the data preferably is stored in the cine memory shown in FIG. 4.

According to step S1, N frames of color mode (velocity or PDI) data and associated b-mode data are acquired out of cine memory over at least one cardiac cycle to be processed by the host processor. An exemplary cardiac cycle is shown in FIG. 6.

According to step S2, b-mode data corresponding to valid color data is formed into an array.

In step S3, the statistics of the b-mode pixels which have valid color pixel values (non-128 values) associated with them is computed (maximum, minimum, mean, std dev).

In steps S4, S5 and S6, a value "k" is computed based on an off-line, experimentally derived linear regression equation and is a function of the statistics:

$$k=f[\max, \min, \text{mean}, \text{std dev}, \max/\text{mean}, (\max-\text{mean})/\text{std dev}]$$

or, as a simpler option, the value of k is taken from a data file for the given probe and application In step S7, the B/Color priority threshold is then calculated as follows:

$$T=\text{mean}+k(\text{std dev})$$

In step S8, T is applied as the new B/Color priority threshold.

More specifically, N frames of cine data are acquired from cine memory 28 and transferred to CPU memory 32 for subsequent processing by the CPU 30. N is determined based on the acoustic frame rate and the assumption that a cardiac cycle is approximately one second in duration. This transfer is accomplished in the most efficient manner allowed by the system to minimize the transfer time.

Each pixel of the N frames of data is checked to verify if its color data is valid (non-128 value). If a pixel is valid for color, its associated b-mode value is accumulated into an array. A count, n, is kept of the number of b-mode pixels accumulated. After all pixels are checked and accumulated, the statistics of the accumulated b-mode pixel array are computed as follows:

Max=maximum pixel value in the b-mode accumulated array.

Min=minimum pixel value in the b-mode accumulated array.

Mean=the average value (arithmetic mean) of the b-mode accumulated array.

Std dev=the sample standard deviation normalized by n−1 of the b-mode accumulated array.

Max/mean (max−mean)/std dev

The number of standard deviations above the mean "k" needs to be chosen in order to determine where to set the threshold, T. The value of k may be set in the data file for a given probe and type of application based on trial and error in clinical scanning. A more robust method would be to compute k after having experimentally derived a linear regression equation across many probes and applications, off-line, where k is a function of the computed b-mode statistics:

$k=f[\text{max, min, mean, std dev, max/mean,(max−mean)/std dev}]$

Multiple sets of color and b-mode cine data need to be collected off-line over many probes and applications and run through a simulation to determine a regression equation for k. This method would allow k and T to adapt based on the statistics. This method would yield a more robust implementation but would also require more work in determining an equation for k.

Whether k is fixed for a given probe/application or is allowed to adapt based on an experimentally derived regression equation, the B/Color priority threshold is calculated as follows:

$T=\text{mean}+k(\text{std dev})$

T is applied as the new B/Color Priority threshold and live scanning is resumed in step S9 (FIG. 5) using these new parameters. The new B/Color Priority threshold will minimize the amount of color bleeding (writing on plaque, walls, and other tissue) without causing an unacceptable number of drop-outs in the flow within a vessel.

Figure 7:
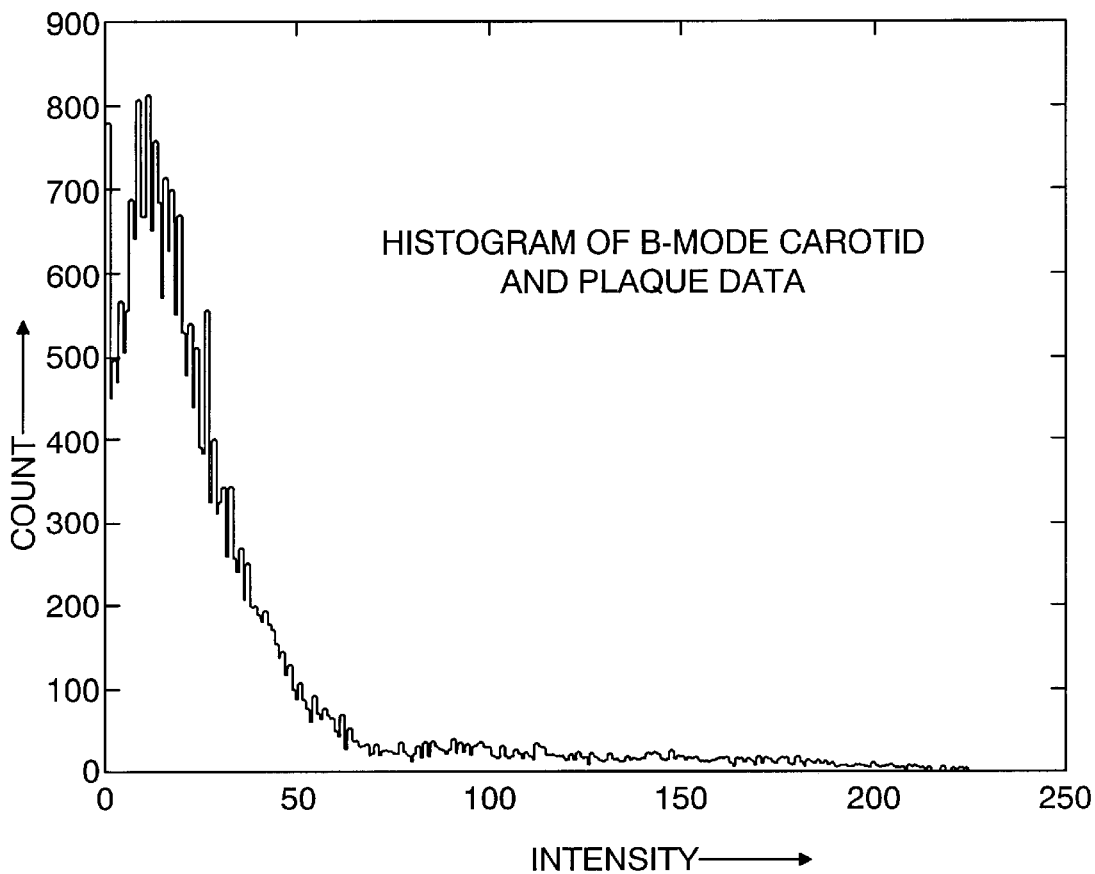
FIG. 7 is an exemplary histogram of b-mode data stored in accordance with one aspect of the preferred embodiment.

FIG. 7 is an example of the b-mode data which is associated with the color and plaque data from a carotid artery, and is a visual representation of the statistics that would be computed for this data based on the processing flow chart of FIG. 5 and its algorithms described above.

The foregoing preferred embodiments have been disclosed for the purpose of illustration. Variations and modifications of the concept of the invention will be readily apparent to persons skilled in the art. All such variations and modifications are intended to be encompassed by the claims set forth hereinafter.

What is claimed is:

1. In an ultrasound imaging system generating color flow signals and b-mode signals in response to ultrasound signals backscattered from a subject under study, improved apparatus for displaying images in response to the color flow signals and b-mode signals comprising:

a terminal connected to receive a threshold signal;

a memory connected to store color flow data in response to the color flow signals and corresponding b-mode data in response to the b-mode signals;

a logic unit connected to obtain an identification of valid color flow data, to conduct analysis of b-mode data corresponding to said valid color flow data, and to alter the value of the threshold signal in response to said analysis; and a display connected to display a color flow image in response to the altered threshold signal.

2. Apparatus, as claimed in claim 1, wherein said analysis comprises statistical analysis.

3. Apparatus, as claimed in claim 2, wherein said analysis comprises determining the mean and standard deviation of said b-mode data corresponding to said valid color flow data.

4. Apparatus, as claimed in claim 3, wherein said the value of said threshold signal is altered according to said mean plus a value derived from said standard deviation.

5. Apparatus, as claimed in claim 4, wherein said value derived from said standard deviation is obtained by multiplying said standard deviation times a multiplier value.

6. Apparatus, as claimed in claim 5, wherein said multiplier value is derived from a linear regression equation.

7. Apparatus, as claimed in claim 1, wherein said data is organized into frames of data representing pixels for presentation on said display, wherein said identification comprises identification of data representing a pixel of said color flow data and wherein said analysis is conducted on b-mode data corresponding to said identified pixel of color flow data.

8. Apparatus, as claimed in claim 1, wherein said subject exhibits a cardiac cycle and wherein said logic unit stores said data over at least one cardiac cycle.

9. In an ultrasound imaging system generating color flow signals and b-mode signals in response to ultrasound signals backscattered from a subject under study, a method of displaying images in response to the color flow signals and b-mode signals comprising:

receiving a threshold signal;

storing color flow data in response to the color flow signals and corresponding b-mode data in response to the b-mode signals;

obtaining an identification of valid color flow data;

conducting analysis of b-mode data corresponding to said valid color flow data;

altering the value of the threshold signal in response to said analysis; and displaying a color flow image in response to the altered threshold signal.

10. A method, as claimed in claim 9, wherein said conducting analysis comprises conducting statistical analysis.

11. A method, as claimed in claim 10, wherein said conducting analysis comprises:

determining the mean of said b-mode data corresponding to said valid color flow data;

determining the standard deviation of said b-mode data corresponding to said valid color flow data.

12. A method, as claimed in claim 11, wherein said altering the value of said threshold signal comprises altering the value of said threshold signal according to said mean plus a value derived from said standard deviation.

13. A method, as claimed in claim 12, wherein said altering the value of said threshold signal comprises altering the value of said threshold signal in part by multiplying said standard deviation times a multiplier value.

14. A method, as claimed in claim 13, wherein said multiplying said standard deviation times a multiplier value comprises deriving said multiplier value from a linear regression equation.

15. A method, as claimed in claim 9, wherein said storing comprises organizing said data into frames of data representing pixels for said displaying, wherein said obtaining an identification comprises obtaining an identification of data representing a pixel of said color flow data and wherein said conducting analysis comprises conducting analysis on b-mode data corresponding to said identified pixel of color flow data.

16. A method, as claimed in claim 9, wherein said storing comprises storing said data over at least one cardiac cycle.

* * * * *